April 3, 1951 P. I. COLE 2,547,257
FLUID SEAL
Filed Sept. 9, 1946
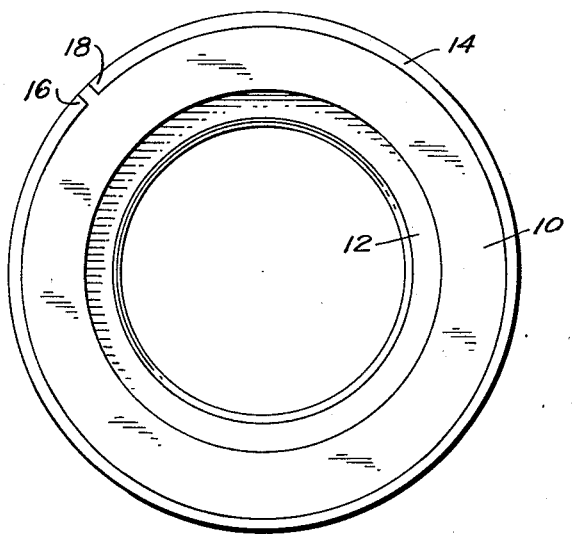
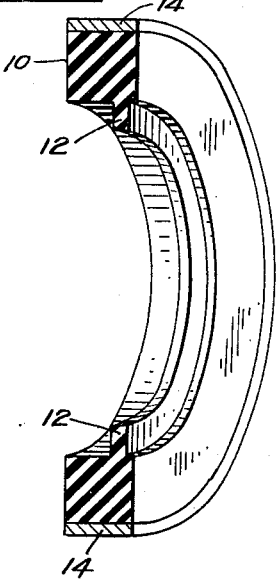
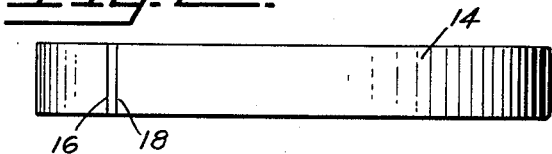
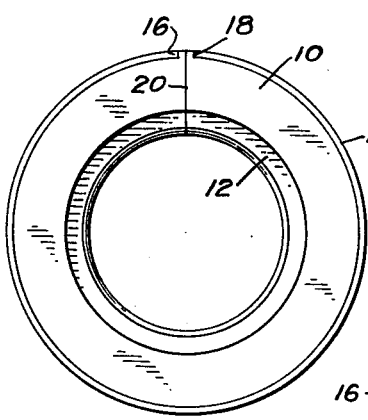
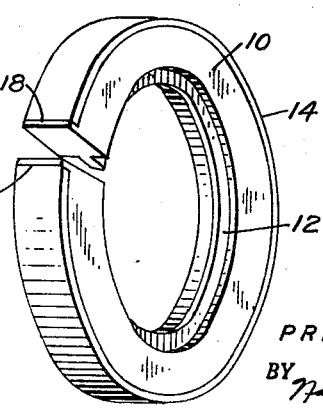
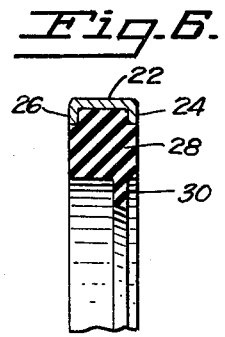
INVENTOR.
PRENTISS I. COLE
BY Naylor and Lassagne
ATTORNEYS Patented Apr. 3, 1951

2,547,257

UNITED STATES PATENT OFFICE 2,547,257

FLUID SEAL

Prentiss I. Cole, Palo Alto, Calif.

Application September 9, 1946, Serial No. 695,664

2 Claims. (Cl. 288—3)

This invention relates to fluid seals, and more particularly to a fluid seal of the washer type.

Among the conventional designs of washer type seals, perhaps the most commonly used species is comprised of a metal washer bonded or otherwise secured to a face of a rubber sealing element so that the peripheral surfaces of the washer and sealing element are in alignment. It is conventional to sleeve the sealing lip of the element on a rotatable shaft and to press-fit the seal within a bore surrounding the shaft. As the seal is in use, the continued contact of the rubber sealing element with a fluid such as oil causes the rubber to shrink away from contact with the bore, thus leaving only slight surface contact between the washer and bore to prevent a case leak, the seepage of oil between the bore and the seal. Also, since the washer is substantially incompressible, its outside diameter must be equal to the inside diameter of the bore. This results in a low order of gripping contact between the washer and bore, and the washer may, after slight use, rotate with the shaft, thus promoting case leaks.

In the attempt to inhibit such case leaks, cup-like washers are utilized whereby a maximum of washer to bore contact is obtained, and a consequent minimization of the tendency for case leaks results. However, in the production of the cup-like washers blanking, piercing and forming compound dies are required. Equipment such as this has a high initial cost, and, due to the number of individual dies necessary for the production of a complete line of seals adapted to varied shaft sizes and varied bore sizes, the smaller scale manufacturer has either to forego the production of a complete line of such seals, or to produce them at an economic loss.

I have devised a washer type fluid seal having improved case leak preventative qualities over the cup-like washer above described and which may be readily manufactured without expensive blanking and piercing dies. This seal is comprised of the conventional rubber sealing element and a split ring retainer member bonded thereto.

The split ring may be manufactured in a number of ways: it may be made from tubing by sawing off a length of tubing equal to the height of the seal, followed by a transverse cutting or shearing of the ring in one place; the ring may be formed from strip stock with a bench bender tool whereby a split circular shape is provided; or the ring may be formed in a punch press with a simple progressive forming dye. Numerous other methods of forming a split ring are possible, and, in each, the equipment cost is negligible in comparison with that required for the production of the cup-like washers above described, thus enabling the fluid seal manufacturer to accept a low volume order where the volume would ordinarily be insufficient to amortize the cost of the conventional tooling.

My split ring retainer provides superior case leak preventative properties over conventional washer type seals. When the ring is split by a sawing operation, a space is produced equal to the width of the saw blade. When the rubber sealing element is molded and bonded to the ring, rubber flows into this space and provides an expansion or contraction joint. Thus, the ring may have a greater outside diameter than the inside diameter of the bore, and the slight contraction of the ring upon being press-fitted into the bore provides for an efficient ring to bore seal, thereby preventing case leaks to a greater extent than a non-split cup-like washer.

A further advantage of the split ring type seal is that it can be used as an oil seal or a dirt seal without reversing the ring, thus eliminating the need for special molds that provide for reversing the washer, as required with conventional washer type seals wherein the washer has to be on the dry side when the seal is used to maintain oil or grease in a housing and on the opposite side, nearest the sealing lip, when the seal is used to keep dirt out of the housing. This procedure must be followed in order to obtain an efficient press-fit in each instance.

Among the objects, therefore, of my invention are the following: to provide a washer type seal having improved case leak preventative properties; to provide a washer type seal having a split ring retainer member adapted to be produced with the simplest and inexpensive tools whereby the unit cost of production is at a minimum; to provide a washer type seal wherein the position of the retainer member is such that the seal is adapted for use, without change, as an oil or grease seal or as a dirt seal; and to provide a fluid seal of the washer type having a split sealing element and a split retainer ring, said seal being adapted to be spread open for imposition on a shaft.

Other objects and advantages of the invention will be apparent from the following description taken in conjunction with the drawing forming part of this specification, and in which:

Fig. 1 is a plan view of an embodiment of the invention;

Fig. 2 is a view in elevation of the split ring seal of Fig. 1;

Fig. 3 is a dimetral sectional view in perspective of the fluid seal of Fig. 1;

Fig. 4 is a plan view of another embodiment of the invention, showing both the rubber sealing element and the retainer member as being split;

Fig. 5 is a view in perspective of the seal of Fig. 4, spread to an open position; and Fig. 6 is a partial view in section of a fluid seal embodying a modification of the split retainer ring.

Referring to the drawing for more specific details of the invention, 10 is an annular rubber sealing element or web supporting a sealing lip 12 inset from the adjacent face of said web and 14 is a split metal ring, having ends 16 and 18, bonded to the element 10. The bonding of the rubber to the metal ring may be accomplished by a number of conventional methods, as for example: the split metal may be cleaned in a solvent to remove all traces of oil or dirt which would have a deleterious effect on the bonding of the rubber and metal surfaces; a coating of thermosetting cement is then applied to the inside surface of the metal ring 14; the ring is then placed in a mold with a piece of uncured rubber of suitable size; the metal ring and rubber are then bonded together in the mold under pressure and at a temperature effective to simultaneously cure the cement and the rubber.

The resultant fluid seal, due to the rubber in the gap between the ring ends 16 and 18, may be effectively press-fitted into a bore to maintain excellent contact between the bore and the ring 14, and the compressing of the ring to bring the ends 16 and 18 closer together, as the ring is press-fitted into the bore, causes no measurable distortion of the sealing lip 12 when it is sleeved on a shaft. Thus, case leaks are more efficiently prevented by the split ring 14 with no attendant loss of sealing efficiency between the lip 12 and the shaft. The ring 14 may be split angularly or transversely, as shown in Fig. 2. It is to be noted that the inset location of the sealing lip 12 from the face of the web 10 allows said lip to take a normal distortion when sleeved on a shaft without the possibility of the lip coming in binding contact with the endface of the bore in which the seal is press-fitted.

Figs. 4 and 5 illustrate a modification of the fluid seal of Fig. 1, the modification being identical to the seal of Fig. 1 with the exception that the rubber sealing element 10 is also split at 20, said split being in alignment with the split between the ends 16 and 18 of the retainer ring 14. The seal may be spread open, as indicated in Fig. 5, to enable a placing of the seal on a shaft which will not admit of a conventional sleeving of a closed ring seal thereon. An example of such a shaft would be a crankshaft installation wherein the crankcase is divided or split on the axis of the shaft.

When the retainer ring 14 is formed of a spring steel, the ring will take no permanent distortion in the spreading operation, and, when the seal is thus placed on a shaft, the sealing properties are equivalent to those obtainable with the seal of Fig. 1.

Fig. 6 illustrates a modification of the split ring which may be used in place of ring 14 of the embodiments of the seals of Figs. 1 and 4. A split ring 22 having flanges 24 and 26 is bonded, as heretofore described, to a rubber sealing element or web 28 supporting a sealing lip 30. The ring of Fig. 6 may be made by using a bench bender to deform strip stock into ring form, thus avoiding the tooling costs necessary for the production of integral rings of the same cross-sectional form. The ring 22 may embody a single flange rather than the pair of flanges 24 and 26 shown.

The flanged structure of the split retainer ring of Fig. 6 is particularly adapted for use with fluid seals of large diameter, while the unflanged ring of Figs. 1-5 is particularly adapted for use with fluid seals of comparatively small diameter. Thus, when the flat strip stock metal is formed into a ring of small diameter, it receives greater working in the process than if formed into a ring of greater diameter. The greater the working of the metal, the greater is the rigidity of the metal and the less the tendency for the metal to revert to its unstressed form. When the diameter of the unflanged ring of Figs. 1-5 exceeds an experimentally determined value, the ring will not receive sufficient working to attain the desired set, and the tendency is that such a ring will tend to open and be sufficiently weak to buckle when press-fitted into a bore. If any buckling results, case leaks will develop and the ring may lose its grip in the bore and revolve with the shaft.

When the diameter of the fluid seal exceeds that diameter at which the unflanged ring of Fig. 1 is satisfactorily usable, the flanged ring structure of Fig. 6 may be used, since the flanges receive sufficient working in the formation of the ring to impart the desired rigidity.

While a number of modifications of the embodiment of the invention have been shown and described, it is understood that the invention is to be limited only by the scope of the appended claims.

What I claim as new and desire to secure by Letters Patent is:

1. A fluid seal comprising a unitary annular web of flexible material, a retainer ring cut through to provide a pair of spaced apart ends, bonded to the outer circumferential surface of said web, said web having a portion thereof extending between the ends of said ring and permanently occupying the space directly between said ends, and a parting line in said portion of the web between the ends of said ring and extending through said web.

2. A fluid seal comprising an annular web of flexible material, a retainer ring bonded to the outer circumferential surface of said web, said ring being continuous except for a single cut therethrough providing a pair of spaced apart ends, said web having a portion thereof extending between the ends of said ring and permanently occupying the space between said ends, and said web having a parting line in said portion of the web between the ends of said ring and extending through said web.

PRENTISS I. COLE.

REFERENCES CITED

The following references are of record in the file of this patent:

UNITED STATES PATENTS

| Number | Name | Date |
|---|---|---|
| 1,662,707 | Hosmer | Mar. 13, 1928 |
| 2,028,634 | Walker | Jan. 21, 1936 |
| 2,274,234 | Ekkebus et al. | Feb. 24, 1942 |
| 2,310,607 | Batesole | Feb. 9, 1943 |
| 2,323,548 | Lewis | July 6, 1943 |
| 2,335,561 | Dodge | Nov. 30, 1943 |
| 2,383,959 | Dick | Sept. 4, 1945 |
| 2,480,116 | Brummer | Aug. 30, 1949 |